United States Patent

Willis

[15] 3,702,902

[45] Nov. 14, 1972

[54] TELEPHONE DIALING EQUIPMENT

[72] Inventor: John R. Willis, Houston, Tex.

[73] Assignee: Electromitor, Inc.

[22] Filed: July 21, 1970

[21] Appl. No.: 56,883

[52] U.S. Cl. ............179/5 R, 179/84 VF, 179/90 B, 179/2 A

[51] Int. Cl. ..........................................H04m 11/04

[58] Field of Search.179/2 A, 2 DP, 5 R, 5 P, 84 VF, 179/90 B

[56] References Cited

UNITED STATES PATENTS

| | | | |
|---|---|---|---|
| 3,582,555 | 6/1971 | Kok | ..........................179/5 R |
| 3,588,362 | 6/1971 | Kass | ..........................179/5 R |

*Primary Examiner*—Ralph D. Blakeslee
*Attorney*—Donald Gunn

[57] ABSTRACT

For use with a conventional telephone system, automatic dialing equipment which includes a master or central station and a remote, automatically triggered, dialing station. The remote station is triggered by an alarm device of no particular interest to the present invention such as one to indicate an intruder or a fire. The remote station, once triggered, electronically dials by forming the necessary make and break signals for the conventional telephone equipment found at the telephone exchange and the message is transferred through the exchange to the master station. The master station is adapted to respond to calls from several remote stations. The master station interrogates the remote station through coded tone pulses and receives a response indicating the identity of the remote station, the nature of the alarm, and other pertinent information which enables it to respond to the inquiry from the remote station and from a signal or output dictated by the nature of the interrogation.

9 Claims, 5 Drawing Figures

Figure 1A:
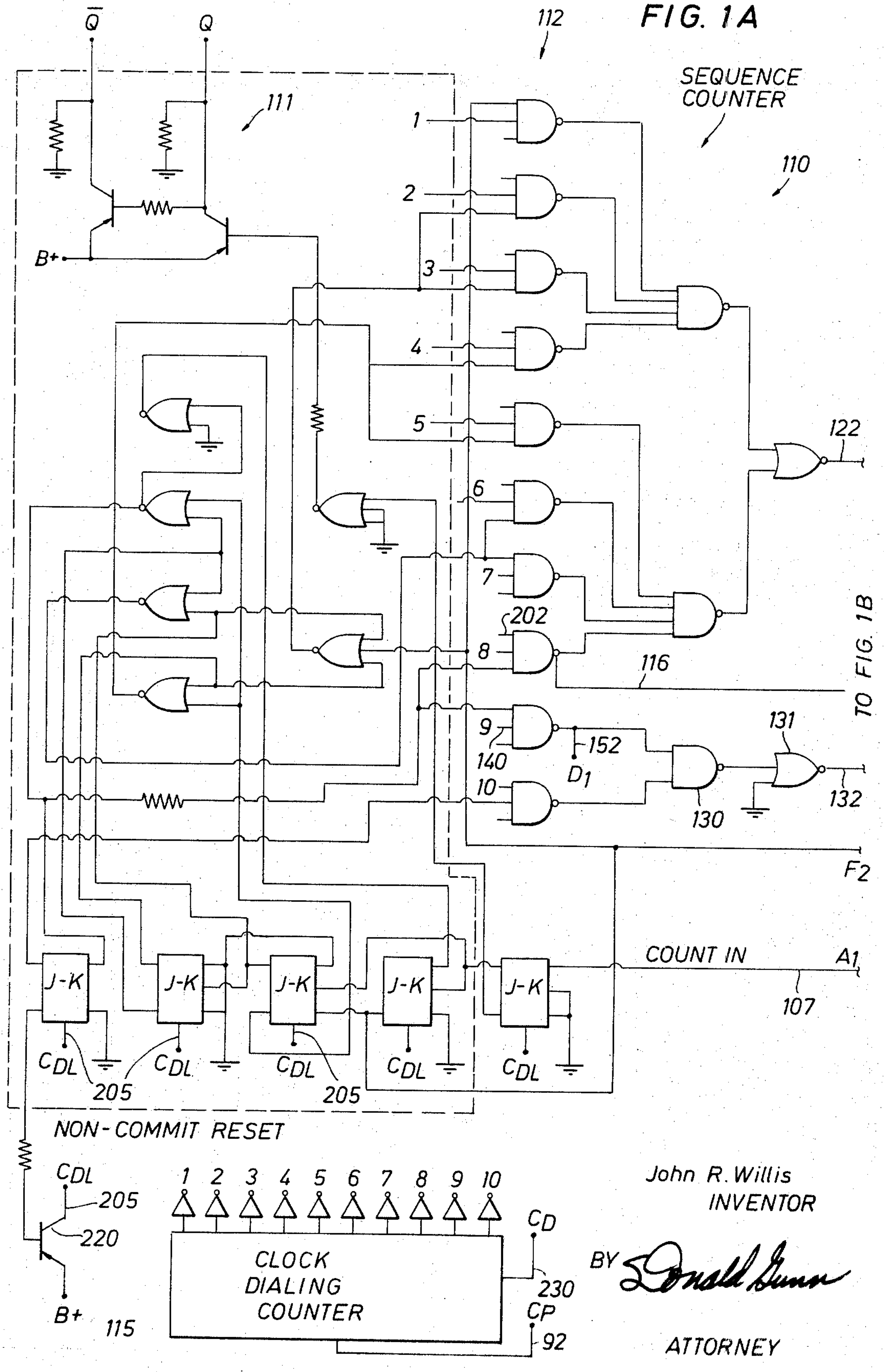

United States Patent [15] 3,702,902
Willis [45] Nov. 14, 1972
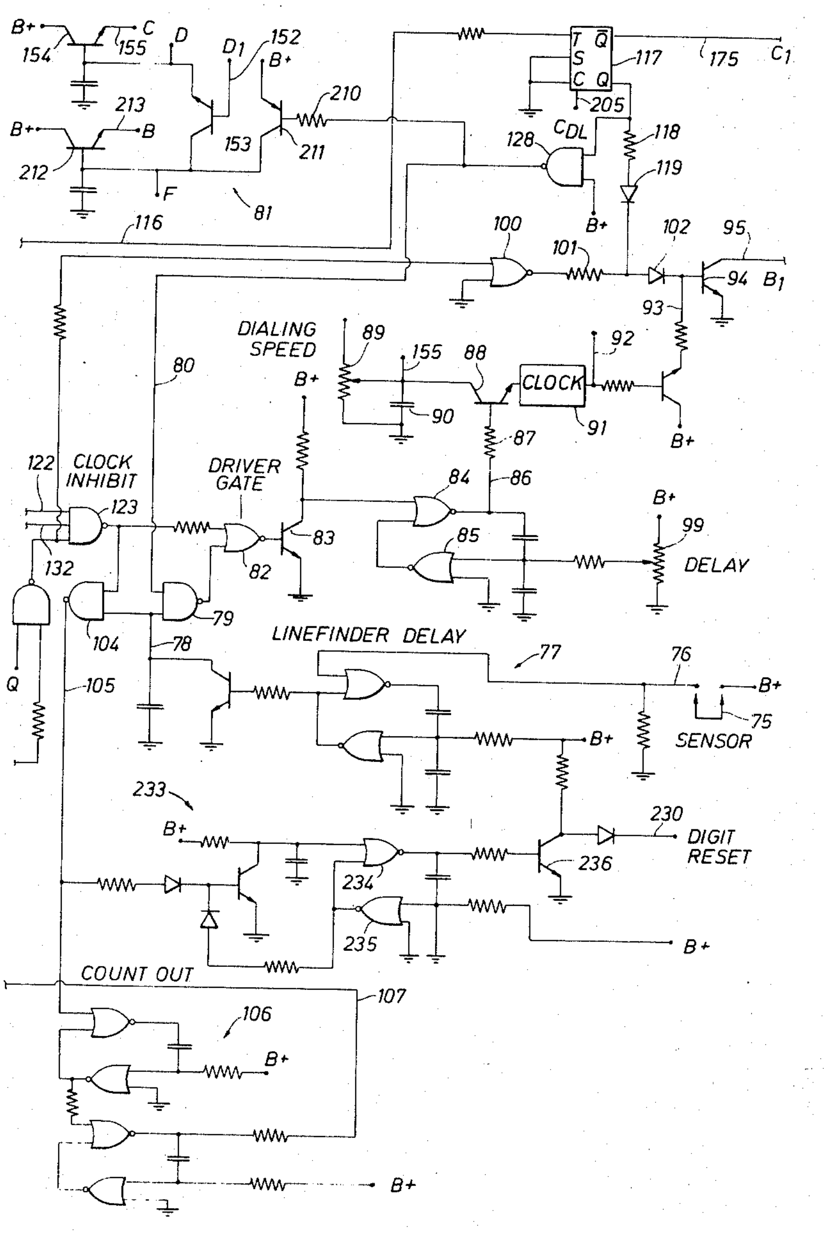

John R. Willis
INVENTOR

BY Donald Gunn
ATTORNEY

John R. Willis
INVENTOR

BY Donald Gunn

ATTORNEY

John R. Willis
INVENTOR

BY Donald Gunn
ATTORNEY

John R. Willis
INVENTOR

BY Donald Gunn
ATTORNEY

John R. Willis
INVENTOR

BY Donald Gunn

ATTORNEY

TELEPHONE DIALING EQUIPMENT

SUMMARY OF PROBLEM AND SOLUTION

For about the last 60 or 70 years, fire or alarm companies have utilized straight line connections from a subscriber or customer to a central data collection point as a basic means of implementing fire protection or an alarm system. The ADT Company has engaged in these activities for a number of years wherein a particular subscriber is wired to the central data collection station of the company and the incoming data from several customers is monitored by an individual at the station. He responds to various lights, bells, or other signals to carry out the necessary emergency actions which are dictated by the nature of the alarm. Quite often, these central stations are connected to the various subscribers through the use of dedicated lines. Dedicated lines are those which have only one customer, or one class of customer, connected to them. Dedicated lines are quite expensive and must be wired around the telephone terminal equipment and must be handled in a unique manner as they cannot be permitted to pass through the conventional cross-bar dialing equipment. Even today, when electronic switching in terminals is contemplated, and cross-bar equipment is obsolete, nevertheless, dedicated lines still present problems to central telephone stations and equipment. Even if it were possible to locate all dedicated lines in a conventional trunk line extending from the central station to the outreaches of its given neighborhood, there are still problems in the use of dedicated lines.

Some have suggested the use of telemetry on various and sundry radio frequencies such as those in an area where a television channel is not used. Telemetry transmissions are, of course, not secure, and telemetry transmitters and receivers require relatively expensive antennas. As the frequency of the telemetry system increases, the cost of fabrication and installation goes up. When the frequency becomes too high, one is forced to resort to exotic antennas and wave guide systems for handling the systems. It will be understood and appreciated that the cost and complexity of such a system is far beyond that which can be borne by equipment of the nature described in the present disclosure.

Many other problems could be noted in passing. However, the foregoing problems are representative of the cumulative problems presented with equipment found competitive with the device of the present invention. The device of the present invention constitutes an improvement of the competitive equipment in numerous regards. The equipment of the present invention will be described in detail hereinafter, but a summary of the equipment directs attention to the existence of master and slave or remote station of the present invention.

The master station is adapted to be connected to a conventional pair of telephone lines. While the equipment must be duplicated, the preferred embodiment will be described with a single pair of lines. A number of remote stations are located in the near vicinity. The stations are located at a distance and spacing from the central station to permit dialing of the central station with the conventional seven digit number. That is to say, the remote stations are not located at such a distance where a long distance call between the two stations would be required. The remote stations are preferably placed about the premises or facilities of someone desiring protection, and hence, the remote facilities are normally connected with various alarm device which respond to intruders, fire, equipment failures, and the like. The remote stations are utilized as alarm devices. Each remote station is equipped with an adjustable mechanism whereby the telephone number of the master station is set into the remote station. Once the main number is set in, the remote station is equipped to call the master station. On the creation of an alarm condition as sensed by various transducers connected with the remote station, it begins a sequence wherein, in a predetermined sequence, the telephone number of the master station is first called. Certain interrogation signals are transferred between the two devices to be sure that an answer has been received and that the call has been correctly placed. After this, the message or signal indicative of the nature of the alarm is then transferred. This is accomplished through conventional telephone equipment which may include the exchanges of a large, major city, or through equipment found in other locations.

In any case, the call is made and completed through conventional telephone equipment and the equipment is then disconnected or permitted to continue in the customary manner. The master station then has the data and such alarm conditions can be implemented at that juncture as are necessary.

Figure 1B:
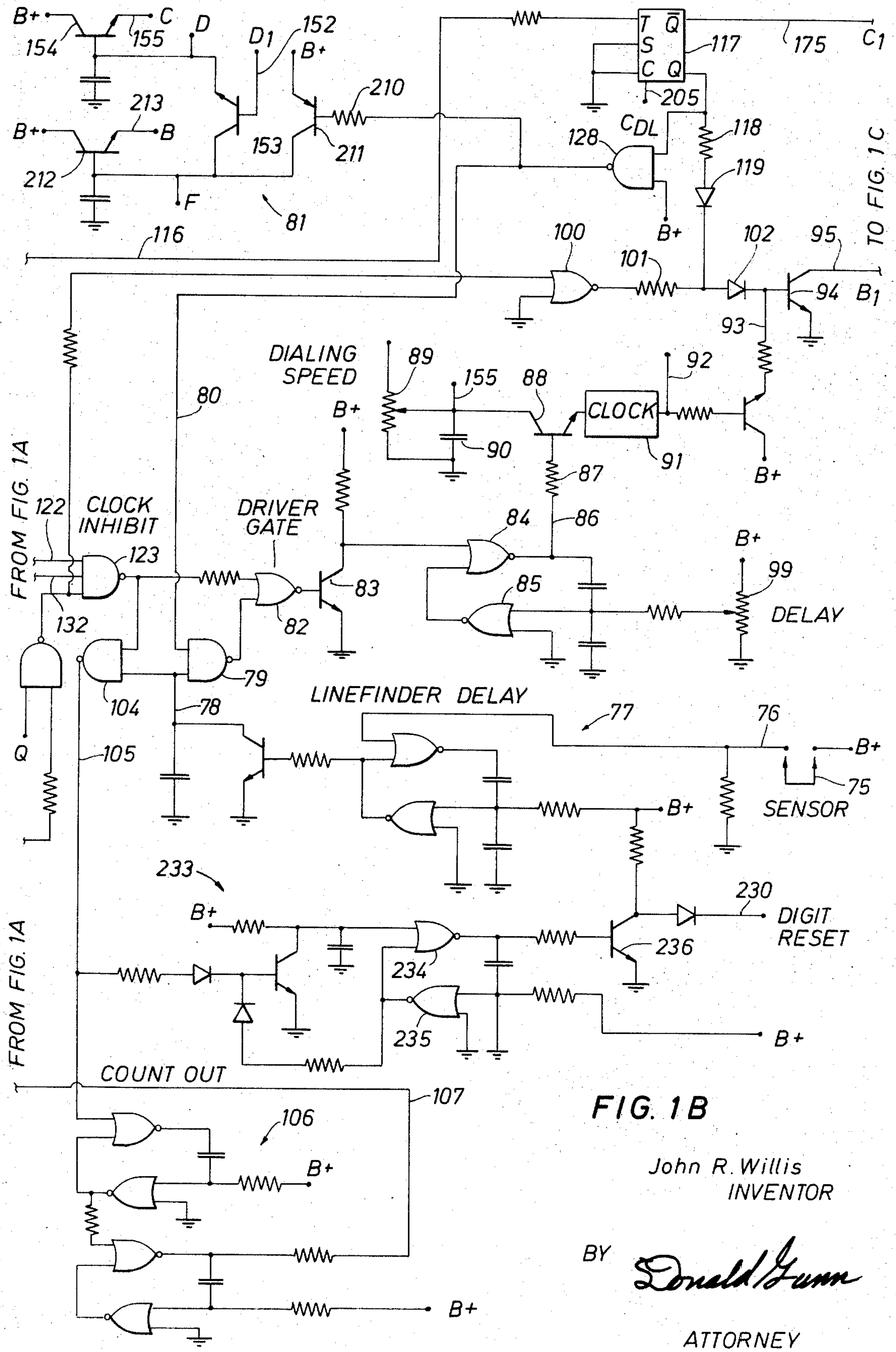
Figure 1C:
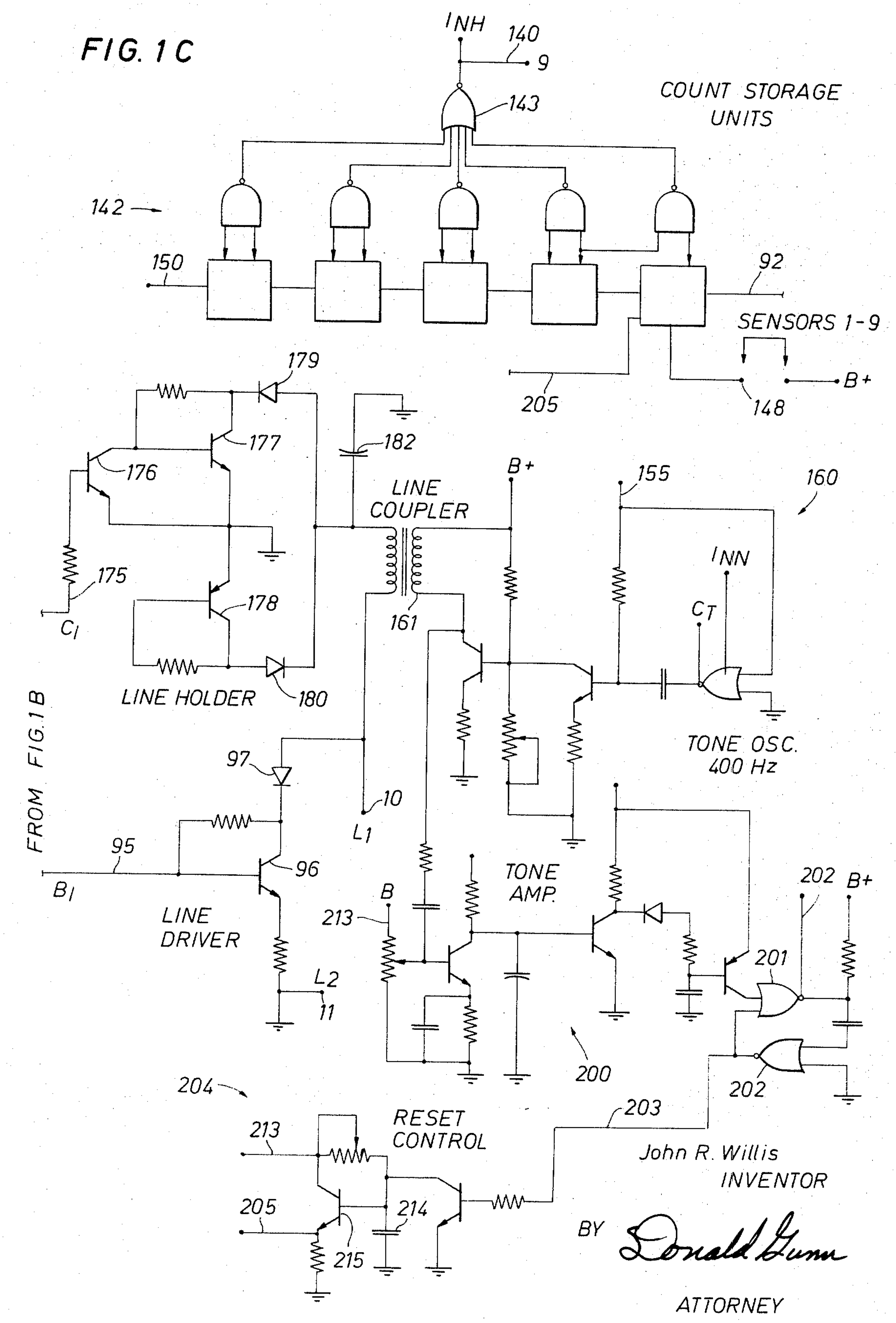
Figure 2A:
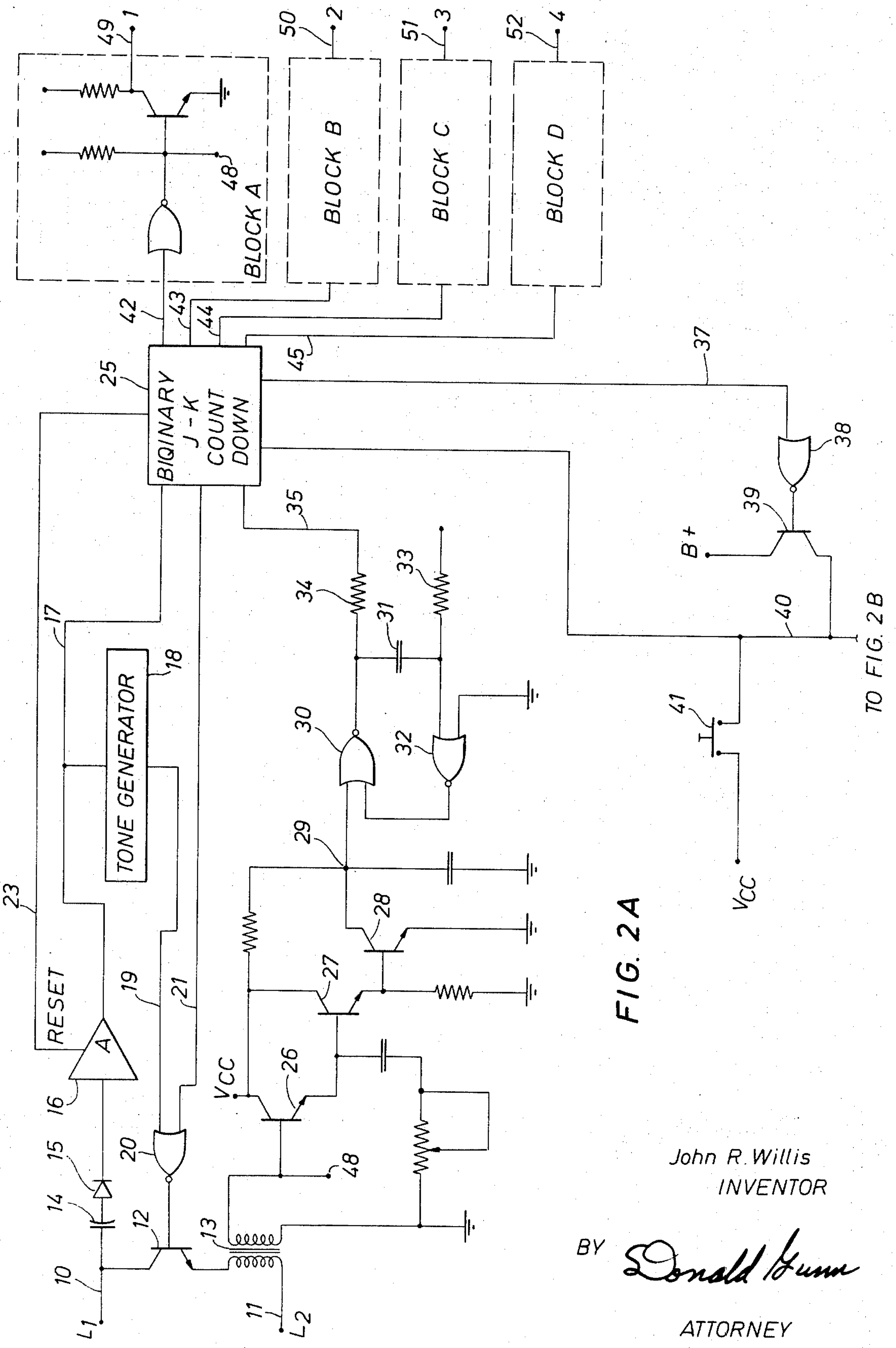
Figure 2B:
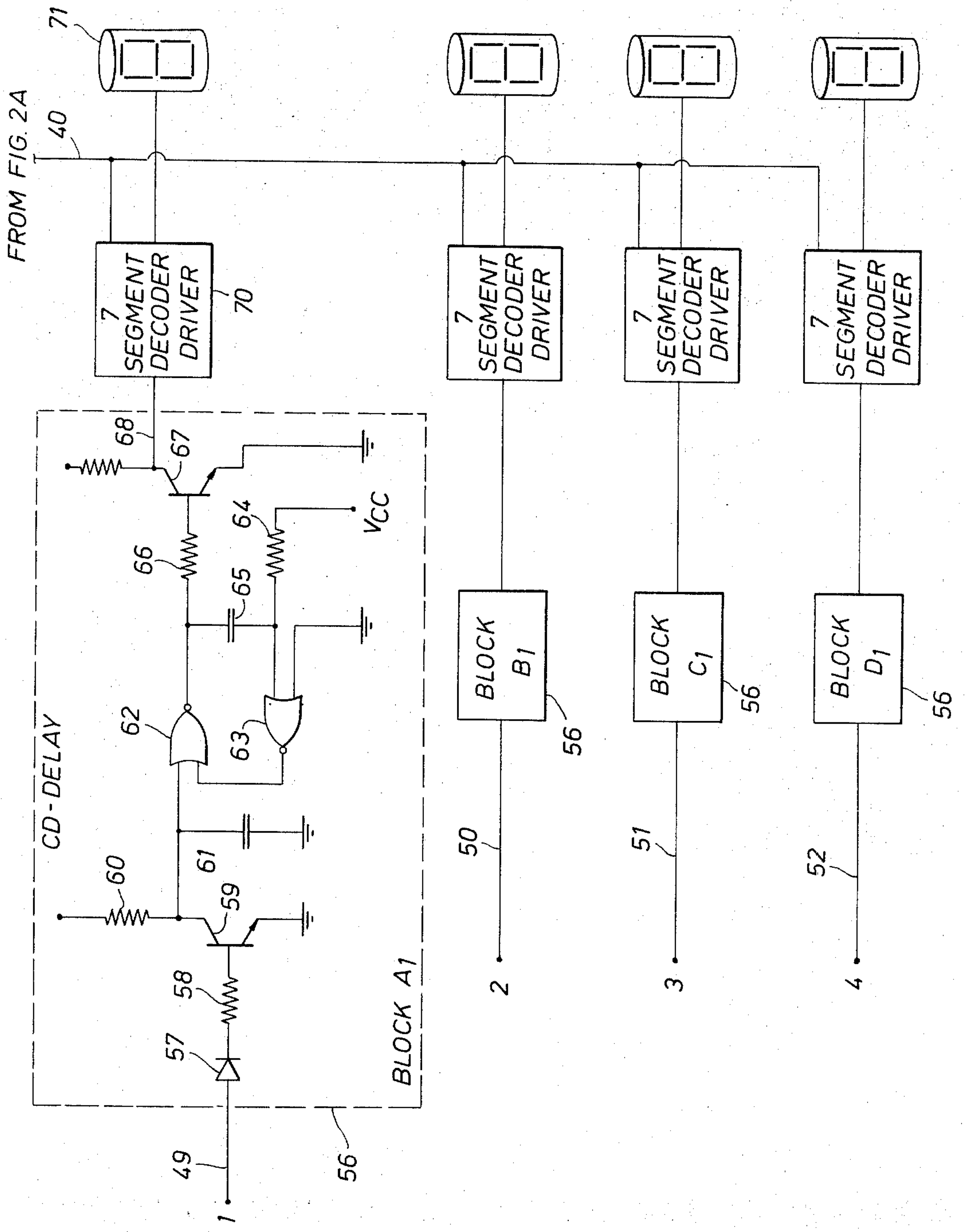

For a more complete understanding of the present invention, reference is made to the following specification and drawings, which are:

FIGS. 1A, 1B, and 1C jointly describe the schematic wiring diagram of the slave unit of the automatic system of the present system; and, FIGS. 2A and 2B jointly disclose the master station of the present invention.

In the drawings, attention is first directed to the master unit shown in FIGS. 2A and 2B. The master unit will be described first, and thereafter, the slave unit shown in FIGS. 1A, 1B, and 1C, will be described. It is believed that description of the master unit, which is relatively simple in comparison with the slave unit, will slightly enhance and make easier the understanding of the slave unit. For this purpose, attention is first directed to FIG. 2A of the drawings.

In FIG. 2A, the numerals 10 and 11 identify a pair of lines which are adapted to be connected with a conventional telephone system. The lines are customarily known in the trade as the tip and ring lines. They are connected through various and sundry types of telephone equipment found in a typical telephone system, the nature of which is beyond concern of the present disclosure. The two lines are input with a switching transistor 12 connected therebetween and controllably metering current flow through the primary of a transformer 13.

In the initial or quiescent condition, the lines 10 and 11 merely reflect an open circuit back into the telephone equipment. This is what is customarily required. An open circuit is one in which the line-to-line impedence exceeds about 10,000 ohms, while a connection is normally characterized by impedence in the range of 1,000 ohms. On receipt of an incoming call, the signal is conducted down the line 10 and through a DC blocking capacitor 14, a rectifying diode 15, and to an amplifier 16. The amplifier 16 turns on and forms an output signal on the conductor 17. The signal on the conductor 17 is applied to a tone generator 18 which forms a signal on the conductor 19 returning to a NOR gate 20. The NOR gate 20 has a second conductor 21, and it will be presumed at this juncture that a signal is present on the conductor 21. When the two signals to the NOR gate coincide, it turns on the switching transistor 12 which thereby permits current flow in the primary of the transformer 13. Upon achieving current flow, the signals are then coupled into the secondary of the transformer and into other circuitry as will be described.

Returning to the amplifier 15, it will be noted that it has a conductor 23 which is utilized to reset or terminate operation of the amplifier 16. Moreover, the conductor 23 is from a biquinary J—K count down circuit indicated by the numeral 25. Pulses are supplied over the conductor 17 to the count down circuit 25 to be counted, and upon termination of its necessary operation, it forms a reset signal on the conductor 23 which terminates operation of the switching transistor 12 to the functioning of the NOR gate 20.

From the foregoing, it will be understood how the telephone equipment first signals the master station shown in FIGS. 2A and 2B jointly. It will be understood how the pulses are passed through the transformer 13 and into the equipment which thereafter responds to the pulses. At this juncture, the description will continue setting forth the nature of the response to the pulses fed into the equipment.

As shown in FIG. 2A, the secondary of the transformer 13 is connected with an emitter follower transistor 26 which provides an input to an additional transistor 27. The transistor 27 is likewise an emitter follower and forms an output signal connected to an additional transistor 28. The transistor 28 is connected to a junction 29 where a signal in the form of one of two voltage levels is formed. It must be emphasized that the equipment is operative with pulses. Hence, frequency content is of no particular concern. Inasmuch as it is dealing with pulses, the pulses are simply converted to two levels at the junction 29. The levels will be termed high and low, and true and false for later discussion hereinafter. The junction 29 forms bilevel signals which are input to an additional NOR gate 30. The output of the NOR gate 30 is connected through a storage capacitor 31, the value of which will be discussed hereinafter, and is then applied to the input of an additional NOR gate 32. As shown in FIG. 2A, the NOR gate 32 is connected back to the input of the gate 30. Through the use of appropriate bias voltages connected through a resistor 33, and the loading created by a resistor 34, circuit values can be readily calculated whereby a monostable multivibrator is defined including the NOR gates 30 and 32. In essence, the circuit responds to the silence or absence of dialing pulses between dialed characters.

Diverting attention for the moment, it will be understood for the present invention that it is best cooperative with telephone equipment and dialing equipment, even the remote or slave station shown in other drawings herein which customarily and normally dial seven digits. The seven digits have a preferred spacing of pulses which are normally defined by the telephone equipment. There must be a gap or space between adjacent digits. Adjacent digits must be recognized and descriminated one from the other. The apparatus in question thus forms a pulse on the conductor 35 which is input to the countdown circuit 25 to advance it from one state to the next. That is to say, the countdown circuit 25 counts the number of pulses in a first group or tone burst, and thereafter counts another group. Two groups are separated as indicated by the signal on the conductor 35 which presets the countdown circuit 25 to count again from zero thereafter.

The conductor 37 identifies an end or word or end of group conductor which comes up in level at the conclusion of the dialing sequence. The conductor 37 is input to a NOR gate 38 which forms an output through a switching transistor 39 to change the level on the conductor 40. The conductor is also connected with a push button switch 41 which is connected to an appropriate positive voltage. The transistor 39 prepares the conductor 40 for formation of a reset pulse. Moreover, a manual reset is provided through implementation of the switch 41. It should be noted that the switch 41 is unable to achieve a reset unless and until the complete counting cycle has been completed. In other words, the count down circuit 25 must recognize and count all pulses transmitted from the slave unit before a signal is formed on the conductor 37 thereby enabling operation of the transistor 39. The switch 41 can be utilized to alter the level on the conductor 40 to form a reset pulse. The reset pulse is applied to the countdown circuit 25 and also to additional circuitry shown in FIG. 2B to reset the readout equipment as will be described later in detail.

The countdown circuit 25 counts the number of groups or individual digits transferred from the slave station. As mentioned before, the preferred grouping includes the seven digits. Preferably, the counter 25 counts at least past seven in case of peculiar dialing codes as might be implemented. The significant factor is that the countdown circuit 25 does count and form output levels on conductors indicated by the numerals 42, 43, 44, and 45. While the present invention has been described as being cooperative with seven digits, the four conductors mentioned are connected to four preferably similar blocks and provide enable signals directing the actual pulses themselves to individual decoding circuits which will be described later. That is to say, the counter 25 recognizes only a whole digit, not the value of the digit itself, and forms enable signals on the conductors 42, 43, 44 and 45. The apparatus has been shown with four similar blocks although the number may be varied in accordance with the needs of a particular installation.

The numeral 48 identifies a conductor which is connected to the secondary of the transformer 13. The conductor 48 is likewise input to all the blocks A, B, C, and D. This is the input which provides the individual pulses to all of the blocks. However, it will be recalled that only one of the blocks is enabled. Since only one is enabled, the pulses input from the conductor 48 are passed only by one of the several devices indicated in FIGS. 2A. The outputs are formed on a number of conductors which are indicated by the numerals 49, 50, 51 and 52. These conductors are shown continued on FIGS. 2B.

In FIG. 2B, the conductors 49–52, inclusive, are shown input to additional circuit elements which are preferably similar. The numeral 56 indicates the first circuit element which is connected to the conductor 49. This circuit element 56 is duplicated at additional locations in FIGS. 2B and as shown, is provided with inputs from the conductors 50, 51 and 52. Briefly, a string of pulses is periodically gated through the conductors 49—52, inclusive. When the pulses are properly enabled by the equipment described in FIG. 2A, pulses are then input through a blocking diode 57 and a series dropping resistor 58 to a transistor 59. The transistor 59 functions as a conventional amplifying transistor having a collector load resistor 60. Any AC signals on the output of the transistor 59 are grounded by a grounded capacitor 61. The output of the transistor 59 is next input to a NOR gate 62 which, in conjunction with an additional NOR gate 63, forms a monostable multivibrator. The monostable multivibrator further includes a bias resistor 64, a timing capacitor 65, and an output series resistor 66. Dependent on the component values selected for the resistors 64 and 66 and the size of the capacitor 65, a pulse is formed by the monostable multivibrator which is input to a transistor 67. The transistor 67 provides an amplified output on a conductor 68 which is then input to a decode driver 70. The decode driver 70 is particularly constructed and arranged for forming a visible output signal on a seven segment indicator lamp as indicated by the numeral 71. The decode driver is a bought item, and it is believed and submitted that its details of construction and circuitry are well known to those skilled in the art and need not form a part of the present disclosure except to mention their utilization. Moreover, the decode driver 70 responds to the number of counts which are input to it to appropriately luminate the visible output tube 71 as is the customary manner to form a signal which is readable visually by the operator of the master unit being described in FIGS. 2A and 2B.

As shown in FIG. 2B, the equipment within the block 56 is duplicated on the other three conductors. The seven segment decode driver 70 is duplicated also. The preferred embodiment preferably provides an output which is four digits in length, and hence, four decode drivers are utilized with four light output tubes.

It will be noted that a common conductor is connected to several decode drivers, and it is the conductor 40 which extends from FIG. 2A. The conductor 40 is the reset which, on operation of the manual switch 41, terminates the signals indicated by the visible light output tubes and resets the various decode drivers to zero.

While the foregoing sets forth the operation of the master station in detail, it is helpful to point out two or three significant factors in its operation. One of the significant factors of its operation is that it forms a tone which in effect interrogates the slave station. Attention is redirected to the tone generator 18 and the NOR gate 20 which is driven by its output. In effect, the tone generator provides a tone of sufficient amplitude and hence, sufficient excursion to drive the NOR gate from cutoff to saturation rather rapidly. This creates a relatively ragged square wave which is output through the switching transistor 12 and hence which forms a chopped signal in the primary of the primary of the transformer 13. The inductance of the transformer 13 is sufficient to slightly round off the square wave and to cause the transmission on the lines 10 and 11 of a signal which is almost a clean signal. While it is not essential that the signal be a pure sinosoidal wave form, it is, nevertheless, of some interest to note that the signal transmitted has a frequency which is determined by that of the tone generator which is received by the slave unit in the form of an interrogation. It should be noted that the length or duration of operation of the tone generator is coincident with each pulse received by the master station from the slave.

While the foregoing describes the master station, its operation should be next correlated to that of the slave station shown in FIGS. 1A, 1B, and 1C together. While substantial quantities of telephone handling equipment intervene between the two devices, nevertheless, attention is next directed to the lines 10 and 11 which are shown in FIG. 1C of the drawings.

A logical sequence of the operation of the slave unit will next be described. While the common point between the master and slave is the telephone lines 10 and 11 shown in FIG. 1C, nevertheless, it seems appropriate to consider operation of the slave unit shown in these three drawings beginning with operation of the sensor. The sensor is shown in FIG. 1B and is indicated by the numeral 75. The sensor is any type or sort of device which forms an alarm condition by forming a voltage at an appropriate supply level on a conductor 76. The conductor 76 shown in FIG. 1B may be only a few inches long, or may be of great length extending about the premises; and may be connected to quite simple or complicated sensing devices. In any case, the conductor 76 is an input from some form or fashion of switch means which provides an increased voltage level on the conductor 76. The conductor 76 may also be paralleled to many alarm devices which function in different manners. In any event, all the devices function to place an appropriate voltage level on the conductor 76 which is detected by the apparatus and which initiates its operation.

The conductor 76 is input to a line finder delay circuit which is indicated generally by the numeral 77. The circuit means 77 forms an output on a conductor 78 after an appropriate delay. Given the chanced possibility that the sensor 75 may close for an intermittent interval to possibly create a spurious signal, the line finder delay signal 77 preferably operates after the sensor 75 has completed its connection for a substantial period of time, perhaps in the range of 500 milliseconds. While this factor can be adjusted depending on the need and environment of the installation, nevertheless, after some delay, a signal is formed on the conductor 78 indicating that the line finder delay circuit 77 is timed out. Similar to other delay circuits, the line finder delay circuit is a pair of NOR gates appropriately connected to form a single shot multivibrator. The conductor 78 is responsive to a negative going signal from the line finder delay circuit 77 to trigger operation of additional circuitry.

The conductor 78 is input to a NAND gate 79. The gate 79 is equipped with an additional input conductor 88 which comes from the power supply which is indicated by the numeral 81 in the upper corner of FIG. 1B. Inasmuch as the negative going signal on the conductor 78 is present at the input, the NAND gate 79 forms a one output which is next input to a NOR gate 82. The gate 82 is connected to a transistor 83. The transistor 83 is connected by means of an appropriate conductor to the input of an additional NOR gate 84. The NOR gate 84, in cooperation with the NOR gate 85, and the appropriate resistors and capacitors, determine the timing of the circuit and form an output on a conductor 86 which is time delayed. The conductor 86 is communicated through a dropping resistor 87 to a transistor 88. The transistor 88 is utilized as a switch. The transistor 88 is connected to a variable voltage source 89 with a grounding capacitor 90 for the purpose of providing a bias level to a clock 91. The bias level controls the clock's speed. The clock 91 is utilized for dialing, and hence, will form what will be called dialing pulses hereinafter. The speed of the pulses is controlled by the adjustment on the resistor 89. The pulses are adjusted dependent on the particular make or manufacture of equipment utilized in the local telephone exchanges. The nominal rate of dialing is 10 pulses per second. Further, the clock forms pulses which have the desired make-break ratio. While the clock 91 forms a rectangular wave form, it is not perfectly symmetrical. The off and on time is varied, again dependent on the particular make or brand of telephone exchange equipment. The clock permits adjustment of this factor also, which is preferably tailored to the equipment.

One output of the clock is on a conductor 92 and another is through the illustrated switching transistor and on a conductor 93. The conductor 93 is communicated through a switching transistor 94 and over a conductor 95 which extends from FIG. 1B to FIG. 1C. The conductor 95 is input through a switching transistor 96 and after clipping by diode 97, is input to the phone lines 10 and 11.

As should be recognized, a certain interval is required before the equipment siezes the telephone lines. An adjustment is provided to accommodate this interval through the auspices of a resistor 99 which is then input to the NOR gates 84 and 85 to provide the timed interval. The time delay circuit which includes these two NOR gates thus permits an adequate interval for seizure of the telephone lines by the equipment.

Continual control of the transistor 96 is of some significance. Referring back to FIG. 1B, the numeral 100 indicates a NOR gate which has a pair of inputs which are normally logic zero. With the logic zero inputs, the output becomes a one which is passed by a series resistor 101 and a diode 102. This causes the transistor 94 to saturate. When the transistor 94 saturates, the line 95 is pulled close to ground potential which cuts off the transistor 96. The transistor 96 is the sole connection between the lines 10 and 11. In its normally conductive state, the impedence between the lines 10 and 11 is approximately 900 to 1,000 ohms. When the transistor 96 is cut off, the impedence between the lines 10 and 11 rises to approximately 10,000 ohms or greater. Hence, control of the transistor 96 constitutes the source of the necessary impedence levels to reflect the correct impedence into the lines 10 and 11 as is required by the central telephone exchange equipment.

Attention is next directed to a gate 104 which is connected to the line 78. When the line 78 changes levels toward a logical zero, this is sensed by the NAND gates 104 and a one is formed on the data line 105. The data line connects through a time delay circuit 106. An output is formed on a conductor 107 which is thereafter fed to circuitry shown in FIG. 1A which will be described hereinafter. Briefly, the time delay circuitry 106 suppresses noises found on the data line 105 and also shapes up the pulse for the line 107 to be sure that the circuitry which is connected to it and shown in FIG. 1A responds properly.

Attention is next directed to FIG. 1A for explanation of the sequence counter indicated by the numeral 110. It is believed unnecessary to detail all operations of the operations of the sequence counter 110. A general or broad discussion will be directed to its operation. The conductor 107 provides the necessary counts to a series of JK flip-flops. The JK flip-flops count through a cycle of ten states. It will be noted that the three left-hand JK flip-flops are connected differently than the two right-hand flip-flops. A number of intermediate NOR gates serve as the decode matrix for various and sundry values assumed by the JK flip-flops and their signals which uniquely enable ten NAND gates which provide the sequence counter itself. A toggle circuit 111 forms the odd and even numbers. The odd and even numbers are connected to the several NAND gates which are indicated by the numeral 112. The NAND gates 112 form a 10 state sequence counter. Obviously, the number of states in the sequence counter can be varied dependent on the nature of the telephone system, complexity of the message to be relayed, and so on. In the preferred embodiment, the first NAND gate indicates the dwell time which is associated with the seizure of the line and initiation of operation of the automatic dialing equipment found in the slave station. It has been assumed that the equipment is operated with a seven digit telephone system. That is to say, local calls are indicated by seven digits. The second through the eighth NAND gates in the grouping 112 are associated with the seven digits of the local call. This then leaves the eighth gate associated with the last digit of the call, and further provides some dwell or interval to permit completion of the call and answer by the master station which was shown in FIG. 2B. The ninth NAND gate of the gates 112 is utilized for data transmission itself, the nature of which will be defined in greater detail hereinafter. The tenth and last gate is associated with cutoff of the equipment.

Because of the need of flexibility of the equipment, preferably the seven digits which are called by the equipment are adjustably set into the equipment. Inasmuch as the equipment can be installed at many different locations and the number to be called may vary from time to time are from region to region, the flexibility is achieved through the use of a clock dialing counter which is indicated by the numeral 115. This is shown at the lower portion of FIG. 1A. The clock dialing counter is somewhat similar to the counting mechanism 110 described. Inasmuch as it is quite similar, it is believed unnecessary to give excessive details of the clock dialing counter 115. Its use and function will be understood better through the use of examples of its connection. Assume for sake of discussion that the number to be called is 7777321. The seven output of the clock dialing counter 115 is thus connected to four consecutive NAND gates, the second through the fifth gates inclusive, of the NAND gates 112. The three, two and one outputs of the clock dialing counter 115 are connected to the sixth, seventh and eighth NAND gates 112. The flexibility of connection permits the equipment to dial any combination of numbers as may be desired. It is believed that the exemplary connection mentioned above will provide an understanding of how the clock dialing counter 115 is connected with the sequence counter 112 and the similarities of the two will become readily apparent as an assistance in construction and manufacture of the present invention.

The first eight NAND gates of the sequence counter 112 are summed through a pair of additional NAND gates as an expediency to avoid placing too many inputs to a NAND gate. These NAND gates are then summed through an additional NOR gate which is connected with a conductor 122 which extends from FIG. 1A to FIG. 1B to a clock inhibit gate 123. As shown in FIG. 1B, the connection of the gate 123 is apparent from the drawings, but its operation should be considered. When the seven digits representative of the number to be called are transferred through the NAND gates 112 and on the conductor 122, the gate 123 toggles to form an input for the gate 82 previously mentioned. The gate 82 in effect sums the signals from the gates 79 and 123. The gate 82 functions through the fixed delay determined by the NOR gates 84 and 85 to initiate operation of the clock 91. Thus, from the gate 82 on, the circuitry associated with the clock 91 functions in the same manner as previously described. When this circuitry functions in the customary and originally described manner, the clock 91 makes and breaks in the formation of a pulse which is fed through the conductor 93 to the switching transistor 94 and the conductor 95. The conductor 95 extends to FIG. 1C as previously mentioned and causes the transistor 96 to switch from off to on in simulation of dialing pulses.

Returning again to FIG. 1A, the eighth NAND gate of the gates 112 is connected to a conductor 116 which extends from FIG. 1A to FIG. 1B. The conductor 116 is input to a flip-flop 117. Its output is connected through a series resistor 118 and diode 119. When the diode 119 becomes conductive, its voltage level is sufficiently high to override any pulses from the clock 91. Thus, the flip-flop 117 is utilized to disable the clock 91 and to prevent its further transfer of pulses to the transistor 96 which simulates the dialing pulse. Inasmuch as the clock 91 finds multiple purposes, it pulses will be utilized in other portions of the circuitry as will be described. After dialing has been completed, it is undesirable that the transistor 96 simulate further pulses into the lines 10 and 11. For this purpose, the flip-flop 117 and the cooperative circuitry mentioned prevents further transfer of clock pulses to the dialing simulation circuitry, including the transistor 92.

An additional output of the flip-flop 117 is indicated at a NAND gate 128. This provides a signal on a conductor 80 previously mentioned. The conductor 80 likewise causes disconnection of the line finder delay circuitry which also is connected with the sensor itself. As will be recalled, the time delay circuitry 77 forms a delay to be sure that the equipment has seized the telephone line. The similarity in the signals on the conductors 78 and 80 will be seen from this analogy.

Returning to the ninth gate of the NAND gates 112 shown in FIGS. 1A, the number 130 indicates a gate which in effect sums the output of the ninth and 10th gates and supplies it to a NOR gate 131. The NOR gate 131 forms an output on the conductor 132 which departs from FIG. 1A and is found in FIG. 1B.

The conductor 132 in FIG. 1B again connects with the clock inhibit gate 123. Thus, this gate again functions to create pulses through operation of the clock 91. In summation, when the ninth gate is energized, the clock 91 forms pulses on the conductor 92 but, keeping in view that the clock 91 is a multipurpose clock, no pulses are passed by the transistor 94. This means that the clock 91 is utilized to generate data under controls which will be described but there is no make and break in the telephone lines 10 and 11 while this data is being transmitted.

Returning to FIG. 1A, as long as the equipment dwells on the ninth gate of the sequence counter 112, data is transferred through the ninth gate and into the telephone lines in the following manner. The ninth gate is connected by conductor 140 which extends from the ninth gate to the count storage register shown in FIG. 1C. In the upper portions of FIG. 1C, the conductor 140 is found. A storage register shown in FIG. 1C is generally indicated by the numeral 142. It includes a right to left shift register comprised of several stages of JK flip-flops. The flip-flops, in conjunction with NAND gates and appropriately wired presets form pulses which are summed through a NOR gate 143 which is connected to the conductor 140.

The broad function of the storage means 142 should now be considered. Several individual sensors are connected to it. The sensors are all indicated by the numeral 148. The nature of the sensors is subject to variation and is beyond the scope of the present disclosure. In any case, the sensors 148 are shown as a matter of convenience and not a limitation on the present invention ranging in quantity up to nine. A particular sensor is triggered and this is data that is useful and should be transferred through the equipment. This data is variable data and is transferred through the several conductors which are connected to the data storage means 142. The data preferably includes five digits. The first is assigned to the sensor 148 which is triggered and hence not preset. The next four digits indicate the assigned call number of the particular slave unit. The ninth state of the sequence counter transfers the variable data and is transferred in a manner as will be described hereinafter. Of significance is the fact that the preset storage register means 142 shown in FIG. 1C forms a unique data code adaptable for transmission which identifies the particular sensor and the assigned call number of the slave unit. All of this data is transferred through the ninth gate previously mentioned.

It will be observed that the preset storage register means 142 functions in response to the clock 91. It is connected with the conductor 92 which inputs the clock pulses. At the completion of counting, the output signal is formed on the conductor 150 to so indicate.

The last state of the sequence counter 110 should next be considered. The 10th NAND gate indicates the end of data transmission and terminates operation of the equipment. The 10th gate is connected through the gate 130 and to the NOR gate 131 to form a signal on the conductor 132. This is connected to the clock inhibit gate 123 shown in FIG. 1B. It inhibits operation of the clock and does not toggle again, and hence, the clock is withheld indefinitely. However, the state of the clock system described to this juncture resembles that of earlier states, and hence, the equipment is still left in an "on" condition. Attention is directed to a conductor 152 which is connected to the ninth gate and which provides the pulses from the ninth gate on the conductor 152 to the power supply shown in the upper left-hand corner of FIG. 1B. There, the conductor 152 is input to a switching transistor. The gate switching transistor is indicated by the numeral 153. The switching transistor 153 controls operation of an additional switching transistor 154. The transistor 154 is connected to a conductor 155. The conductor 155 is next shown in FIG. 1C. The conductor 155 provides power for an oscillator circuit which is indicated generally by the numeral 160. The oscillator circuit forms a tone at a pre-set frequency, such as 400 hertz.

At this juncture, strong emphasis should bee placed on the two types of pulses which are formed by the present invention. The dialing pulses are formed by making and breaking the lines 10 and 11. This is simulated by the transistor 96. Data pulses in the form of tone bursts are formed by the oscillator 160. The oscillator 160 forms a tone at the selected frequency which is transferred through several stages of amplification through a coupling transformer 161. The transformer 161 is connected to the line 10 and inputs the tones into the telephone system. Thus, the two classes of pulses have been described as make and break on the one hand, and tone pulses on the other, and further, both are derived from the same clock 91. The two types of pulses are both input to the lines 10 and 11. The only difference is the utilization of the oscillator 160 to form tones and the switching transistor 96 to form the pulses.

Considering the sequence counter broadly, the transfer of dialing pulses requires making and breaking of the line connection. On the other hand, the transfer of data through the use of the tone oscillator 60 requires that the line be held. For this purpose, attention is directed to the flip-flop 117 at the top of FIG. 1B. A conductor 175 extends from that flip-flop to FIG. 1C. In FIG. 1C, the conductor 175 turns on a switching transistor 176. When it is turned on, it makes possible current flow through a complementary pair of transistors 177 and 178. The diodes 179 and 180 merely steer current flow to ground. With the complementary pair, it is of no consequence which line of the lines 10 and 11 is relatively positive. In essence, the primary of the transformer 161 which is connected across the lines 10 and 11 is connnected in series with a small resistance on the order of three to five ohms. In effect, the line connection is held by the effective grounding of the upper end of the primary of the transformer 161.

AC signals are likewise grounded through a capacitor 182 which is likewise grounded from the primary of the transformer 161.

To this juncture, the circuitry which causes the sequence counter to count from one state to the next has not been clearly identified. It will be noted that there are ten NAND gates 112. The advance from one gate to the next will next be considered. In FIG. 1B, the NAND gate 104 is provided with two inputs, one from the line seizure circuitry 77 and the other from the gate 123. Recalling the inputs to the gate 123, it will be noted that all 10 states of the sequence counter create signals which pass through the gate 123. Hence, the gate 104 becomes cognisant of each change of state of the sequence counter 110 shown in FIG. 1A. It forms a signal on the conductor 105, which, after due shaping by the noise suppressing and pulse shaping circuitry 106, forms a pulse on the conductor 107 which is input to the ten state counter at the lower portions of FIG. 1A. This advances this counter and causes the sequence counter to advance by enabling the next NAND gate of the plurality of gates at 112.

There exists a possibility that a number might be misdialed. This is possible due to noise on the line, malfunction of the central exchange, and numerous other reasons. It is preferable that the slave unit interrogates the master and receive back a tone indicating that a correct number has been dialed. For this purpose, the master unit as shown in FIGS. 2A and 2B includes a tone forming circuit. This circuit forms a tone and transmits it back through the telephone lines 10 and 11. This tone is received by the lines 10 and 11 shown in FIG. 1C and is coupled through the transformer 161. This input tone is next connected through a tone amplifier which is generally indicated by the numeral 200. The tone amplifier merely amplifies and frequency discriminates the incoming tone. If the tone is inappropriate as to either frequency or amplitude, the equipment will take necessary steps to redial the number, and re-dialing is continued until the correct number is dialed and the proper tone is received from the master unit.

For consideration of the tone amplifier and its function, attention is directed to FIG. 1C. There, the tone amplifier 200, an amplifier which is believed does not require excessive description, responds to the input signals and forms a DC level which is input to a NOR gate 201. One output of the NOR gate 201 is over a conductor 202 which is input to the eighth NAND gate shown in FIG. 1A. The conductor 202 is also shown in that view. The NOR gate 201, in conjunction with an additional gate 202, forms a time delay circuit. The length of the delay is determined by the voltage level furnished and the appropriate resistors and capacitors connected to the NOR gates 201 and 202. Hence, once the amplifier 200 recognizes the return tone from the master unit, a signal is formed on a conductor 203 which enables continuation of the operation.

The conductor 203 is next input to a reset control indicated generally by the numeral 204. The circuitry at 204 forms a signal on the conductor 205. The conductor 205 is returned to FIG. 1A at the lower left-hand portion.

Operation of the equipment in the presence of a tone is believed understood. If the master unit transmits a tone which is recognized by the tone amplifier 200, a signal is formed on the conductor 202 which is returned to the eighth gate and causes the sequence counter to step to the ninth gate for transmission of the data which will be duly received and recorded.

Suppose, for sake of discussion, that a wrong number is dialed, or for some reason the telephone continues ringing with no answer. This denies the slave unit a tone which indicates the recognition of the dialed signal by the master unit. On absence of the tone recognized by the amplifier 200, no signal is formed on the conductor 202. The count sequencer 110 dwells on the eighth gate, and hence, the eighth state. After an interval, the flip-flop 117 shown in FIG. 1B recognizes the end of the dialing sequence and forms an output signal which is sensed by the gate 128 previously described which forms a signal on a conductor 80. The conductor 80 is input through a series resistor 210 which turns on the transistor 211 shown in the power supply circuitry at 81. The transistor 211 turns on a transistor 212 which furnishes power over the conductor 213 to the tone amplifier 200 and the reset control indicated generally at 204. The reset control 204, when provided with B+ voltageoon the conductor 213, begins charging a capacitor 214. Once the capacitor is charged to an adequate level, the transistor 215 begins to conduct. When this transistor begins to conduct, a signal is formed on the conductor 205 which returns to the sequence counter at the lower left hand corner of FIG. 1A. This line is connected in common to the JK flip-flops which comprise the sequence counter 110 and resets them to the first state. When this is achieved, the first NAND gate 112 is thus enabled and the telephone number is re-dialed.

It should be noted that the transfer of data has been aborted in the sequence just described. The particular number identifying the slave unit has not been transferred, and the perishable data which indicates which of the sensors 148 shown in FIG. 1C has been tripped and has not been transferred. Only after all of this data has been transferred does the transistor 220 shown in the lower left hand corner of FIG. 1A form a reset signal on the conductor 205 which is then supplied to the count storage unit 142 generally indicated in FIG. 1C. At this juncture, the perishable data is reset. This indicates that the data has been transferred inasmuch as the count sequence means of FIG. 1A is cycled from its first state fully back around to the first state. It then dwells on the first state and the equipment next prepares to drop the telephone line which has been seized. Dropping of the seized line is achieved through an additional toggle of the flip-flop 117 which is also common to the clear line 205.

Attention is next directed to the data line 105 shown in FIG. 1B. It will be observed that the levels on this line rise and fall as the sequence counter steps from state to state. The dialing of the sequence counter, particularly the first seven digits which identify the telephone number to be called, is controlled by the clock dialing counter 115. It is apt to note that this counter 115 has to be reset after each use inasmuch as it is connected in common to the first several states of the sequence counter. The sequence counter is provided with a conductor 230 which is shown in FIG. 1B. Circuitry generally indicated at 233 is made responsive to the rise and fall of the levels on the data line 105. As the data line advances from state to state in sequence with the sequence counter 110, the fall in voltage is transferred through pulse shaping circuitry to a pair of NOR gates which form a delayed signal. The NOR gates are indicated by the numerals 234 and 235. These gates, in conjunction with associated capacitors and resistors, form an output signal for a transistor 236. When the transistor 236 is switched on, a reset pulse on the conductor 230 is formed and is supplied to the clock dialing counter 115 to reset it to its first state.

It will be understood that the resetting of the clock data counter enables each number to be dialed from one and prevents the register from accumulating the counts of the several numbers or digits to be dialed.

The foregoing has been directed to a description of the slave units. While it would be of interest to recite the entirety of the sequence of operation, it is believed that the sequence of operation has been given in smaller and more readily understood portions in describing the circuitry itself. Hence, for those who are interested in how the slave unit operates, the entirety of the description of the circuitry is referred to inasmuch as the descriptive sequence of operation and interrelationship of the equipment is dispursed throughout that description.

While many variations and alterations in the present invention may be implemented, the scope of the present invention is determined by the claims which are appended hereto.

What is claimed is:

1. A remote automatic dialing station adapted to be connected to a central station by a telephone system including a telephone line, and which is responsive to data transferred over the telephone in the form of pulsed signals and which is further adapted to be responsive to a plurality of remote stations, and wherein the central station forms a tone to indicate completion of a telephone circuit between a remote station and the central station and the tone is transmitted over the telephone lines to the remote station, said remote station comprising:

means for switching said remote station to an operable state in response to a predetermined event;

sequencer control means in said remote station initiated in operation by said means for switching said remote station to an operable state for controlling in an ordered manner the dialing of a telephone number for temporarily connecting said remote station with a central station and for transferring information thereto;

clock means;

means for generating numbers as might be used by said sequencer control means in effecting a telephone line connection between said remote station and the central station;

telephone dialing pulse means for dialing telephone numbers of the central station as formed by said number generating means in response to controlled operation of said sequence control means and at a rate determined by said clock means;

means for transferring data from said remote station to the central station having a message content thereto for identification of said remote station, said means being operated in controlled sequence by said sequencer control means at a rate determined by said clock means;

tone generator means adapted to be connected to the telephone lines for forming pulses controlled by said data transferring means;

amplifier means connected to the telephone lines for amplifying tones received through the telephone lines from the central station;

means connected with said tone amplifier means for examining incoming signals and determining whether or not a signal comes from the central station;

audio oscillator means for forming a tone in said remote station, said audio oscillator means being switched on at a rate controlled by said data transferring means in a manner to encode data and said audio oscillator means comprising a portion of said tone generator means;

transformer means for coupling signals into and out of the telephone lines connected with said remote station, said transformer means connected with said amplifier means and said audio oscillator means for transferring data therethrough; and, switching transistor means comprising a portion of said telephone dialing pulse means, said switching transistor means and said transformer means both being cooperatively connected with the telephone line for transferring data into and out of said telephone lines.

2. The invention of claim 1 wherein said means for generating numbers is connected with said clock means and includes a ten state register and has an output for each of the 10 states, and each of said outputs is adapted to be connected with said sequencer means.

3. The invention of claim 1 wherein said sequencer control means includes a first dwell state, a state for each of the numbers required for dialing of the telephone number for temporarily connecting said remote station with the central station, a state at the conclusion of dialing, a state permitting transfer of data by said data transferring means, and a state causing disconnection of said remote station from the telephone line to the central station.

4. The invention of claim 1 for connection with a pair of telephone lines including:

a. switching transistor means connected between the telephone lines, said switching transistor means having at least two operative conditions, one of which simulates the make, and the other of which simulates the break of conventional telephone dialing apparatus wherein the make is characterized by having a line-to-line impedence of approximately 1,000 ohms, and the break is characterized by having an impedence exceeding approximately 10,000 ohms; and, b. said tone generating means being connected across said telephone lines for transferring pulses formed thereby into the telephone lines.

5. The invention of claim 1 wherein said telephone dialing pulse means incorporates a switching transistor connected between the telephone lines, circuit means connected to said transistor means for controllably switching said transistor means from a saturated state to a cut-off state; series impedence means cooperative with said transistor means for providing a predetermined impedence within a given range line-to-line of the telephone lines connected thereto; and, means for connecting tones into the telephone line which are within the audio range as generated by said tone generator means.

6. The invention of claim 1 including means for generating an identification symbol indicative of the particular remote station; means for uniquely identifying the manner in which said means for switching said remote station to an operable state is identified; said two foregoing means forming the data for said data transferring means; and, said data being embodied in an alphanumeric code by said tone generator means.

7. The circuit of claim 1 further including means connected to said means for examining incoming signals responsive to the incoming signals, said means causing said telephone dialing pulse means to dial telephone numbers for the central station a second time in the event that said last named means determines that the signal did not come from the central station.

8. The circuit of claim 1 wherein said means for examining incoming signals includes means for detecting an incoming signal of a predetermined duration within a predetermined frequency range.

9. The circuit of claim 1 wherein said means for examining incoming signals includes a tone filter means which is tuned to form an output signal when the central station transmits a signal through the telephone lines dependent on the frequency thereof, and further including a circuit means connected to said tone filter means and responsive to the occurrence of a predetermined tone from the central station, said means being connected to said sequencer control means in a manner such that said sequencer control means re-dials the telephone number of the central station on the absence of a signal from said tone filter means, and said sequencer control means further transfers data by operation of said tone generator means on receipt of a signal from said tone filter means.

* * * * *